Patented Feb. 5, 1929.

1,701,229

UNITED STATES PATENT OFFICE.

CHRISTIAN EBERT AND THEODOR BECKER, OF ELBERFELD, GERMANY, ASSIGNORS TO I. G. FARBENINDUSTRIE AKTIENGESELLSCHAFT, OF FRANKFORT-ON-THE-MAIN, GERMANY.

PROCESS FOR THE MANUFACTURE OF CELLULOSE ESTERS AND CONVERSION PRODUCTS THEREFROM.

No Drawing. Application filed February 17, 1927, Serial No. 169,129, and in Germany February 22, 1926.

The present invention relates to a process for the manufacture of cellulose esters and conversion products therefrom by subjecting cellulose material to acidulation in the presence of halogenides of sulphurous acid and heavy metal salts, advantageously together with a diluent.

It is well known that a whole series of compounds, so-called catalysts, has already been proposed as contact substances in the acidulation of cellulose material. With the exception of sulphuric acid all of the said catalysts have the disadvantage that the acidulation takes place only comparatively slowly. Sulphuric acid, its derivatives and compounds, although indeed offering the advantage of so accelerating the acidulation that it takes place in a considerably shorter time, entail however the great disadvantage of themselves entering into the cellulose ester molecule, whereby the stability of the respective esters, such for example, as cellulose acetate and the like is unfavourably influenced.

According to the present invention the duration of the acidulation is restricted to a few hours only by the combination of heavy metal salts with halogenides of sulphurous acid, as for example, thionyl chloride. In this manner cellulose compounds are obtained, which can, if desired, be converted according to the known methods into acetone-soluble or ethylacetate-soluble products. This favourable behaviour of the combined application of metallic salts and say, thionyl-chloride is all the more surprising since on the one hand acidulation with the application of the same salts alone only proceeds very slowly and on the other hand is incomplete when employing thionyl chloride alone as the catalyst.

The following example will illustrate the principle underlying our invention, which is applicable within very wide limits:—

Example.

25 parts by weight of cellulose, as for example in the form of cotton, are acetylated at about 65° C. with 75 parts by weight of acetic anhydride and 100 parts by weight of glacial acetic acid, after the addition of 0.25 part by weight of zinc chloride or cuprous chloride and 1.4 parts by weight of thionyl chloride. The cellulose thereby gradually passes into solution and the acetylation is completed after about 6 hours. The solution of primary acetate thus obtained is treated with 12.5 parts of water and kept at 45-50° C. until a test portion shows solubility in acetone or ethyl acetate

We claim:—

1. Process for the manufacture of cellulose esters comprising the steps of effecting the acidulation of cellulose material with the aid of an acid anhydride in the presence of a halogenide of sulfurous acid and a heavy metal salt and hydrolyzing the same to form a cellulose acetate, soluble in acetone or ethyl acetate.

2. Process for the manufacture of cellulose esters comprising the step of effecting the acidulation of cellulose material with the aid of acetic acid anhydride in the presence of a halogenide of sulfurous acid and a heavy metal salt and hydrolyzing the same to form a cellulose acetate, soluble in acetone or ethyl acetate.

3. Process for the manufacture of cellulose esters comprising the steps of effecting the acidulation of cellulose material with the aid of acetic acid anhydride in the presence of thionyl chloride and a heavy metal salt and hydrolyzing with acetic acid the same to form cellulose acetate, soluble in acetone or ethyl acetate.

4. Process for the manufacture of cellulose esters comprising the steps of effecting the acetylation of cellulose material with the aid of acetic acid anhyride in the presence of thionyl chloride and zinc chloride and hydrolyzing the same by means of acetic acid to form cellulose acetate, soluble in acetone or ethyl acetate.

In testimony whereof we have hereunto set our hands.

CHRISTIAN EBERT.
THEODOR BECKER.